… …

United States Patent [19]

Malone

[11] Patent Number: 5,445,740

[45] Date of Patent: Aug. 29, 1995

[54] FLOATING MEDIA BIOFILTER

[76] Inventor: Ronald F. Malone, 2017 General Lee Ave., Baton Rouge, La. 70810

[21] Appl. No.: 182,791

[22] Filed: Jan. 13, 1994

[51] Int. Cl.⁶ .............................................. C02F 3/00
[52] U.S. Cl. ................................. 210/618; 210/793; 210/796; 210/808; 210/107; 210/108; 210/150; 210/151; 210/248; 210/276; 210/277; 210/280
[58] Field of Search .............. 210/615, 616, 617, 618, 210/741, 792, 793, 794, 795, 796, 807, 808, 107, 108, 150, 151, 248, 269, 275, 276, 277, 280, 383, 393

[56] References Cited

U.S. PATENT DOCUMENTS

| | | | |
|---|---|---|---|
| 3,819,054 | 6/1974 | Long et al. | 210/199 |
| 4,198,301 | 4/1980 | Iwatani | 210/274 |
| 4,547,286 | 10/1985 | Hsiung | 210/738 |
| 4,885,083 | 12/1989 | Banks | 210/274 |
| 5,009,776 | 4/1991 | Banks | 210/274 |
| 5,126,042 | 6/1992 | Malone | 210/150 |
| 5,227,051 | 7/1993 | Oshima | 210/150 |
| 5,232,586 | 8/1993 | Malone | 210/151 |

*Primary Examiner*—Robert A. Dawson
*Assistant Examiner*—Robert James Popovics
*Attorney, Agent, or Firm*—Robert C. Tucker; William David Kiesel

[57] ABSTRACT

A floating media biofilter is provided, comprising a tank having a bottom and a sidewall, the sidewall having a lower portion inwardly sloping toward the bottom. Floating media are present in the tank for forming a media pack when the tank is filled with liquid, and the media are retained by an upper screen positioned in the upper portion of the tank. An inlet line provides nonfiltered liquid to the tank from an aquaculture environment, while an outlet line above the upper screen delivers filtered liquid back to the aquaculture environment. A weir is employed between the upper screen and the outlet line to collect filtered liquid from the media pack. Backwashing is accomplished by a motorized blade system which causes the media to circulate within the tank with substantially no expansion of the media pack. The circulating media loosens filtered matter and sludge entrained therein so that the waste solids can be removed by a sludge line connected to the bottom of the tank. A bypass line connected between the weir and the inlet line divert liquid from the environment to provide an additional flow of liquid over the media during backwashing operations. The slow speed and manner of the media circulation serve to protect the beneficial biofloc film on the media pellets from becoming sheared away during backwashing, and minimizes the size of various components required to operate the biofilter.

15 Claims, 3 Drawing Sheets

FLOATING MEDIA BIOFILTER

BACKGROUND OF THE INVENTION

I. Field of the Invention

This invention relates generally to wastewater treatment systems which biologically treat wastewater and, more particularly, to biological treatment systems which use floating filter media to biologically treat wastewater.

II. Description of Prior Art

In high density aquaculture systems used for the production of aquatic animals such as catfish, tilapia, alligators, and clams, and in other water systems which generate wastewater, it is necessary to remove suspended solids, optimize nitrification and to reduce biochemical oxygen demand (BOD) of the wastewater. In all cases, treated water is eventually returned to the ecosystem, whether the return is to a lake or stream or back to a controlled aquaculture system. Varying load and flow conditions make operation of waste treatment systems difficult, in that the timing of treatment steps is dependent upon such changing conditions.

In the operation of any wastewater treatment system, it is desirable to waste as little water as possible and to maximize the concentration of waste sludge accumulated by the system. This is especially true in high density aquaculture systems, where constant recirculation of water is necessary, and where it is desirable to minimize the amount of water wasted in the treatment process. Water loss also becomes critically important when the waste water volume approaches the volume of the aquaculture system being treated, such as in aquaria used in pet stores and research labs. The principal problems with high water loss in any aquaculture system are: 1) the costs of treating high volumes of the backwashed waters, 2) in warm water aquaculture systems, heat losses due to release of the backwash water, 3) increased water demands and pretreatment costs, and 4) high capital costs for pumps and other equipment whose size is dictated by peak water demands.

Most prior art systems accomplish treatment using various traditional treatment components, such as aeration basins, filters and clarifier units, with each component having its own treatment and energy consumption limitations. A system which efficiently combines the features of separate component systems would have greater advantages over those presently in use.

The only known filters which overcome most of these problems are the biofilters disclosed in U.S. Pat. Nos. 5,126,042 and 5,232,586, both issued to the inventor herein, Dr. Ronald F. Malone (hereinafter "Malone I" and "Malone II", respectively). Malone I uses a tank having sidewalls which are inwardly sloping toward the bottom, wherein a floating media pack is caused to form near the top of the tank when it is filled with liquid during filtration. A high-speed, propeller-type agitator is employed to fluidize and expand the media pack and break up the filtered matter prior to backwashing the system. A drain line is opened near the bottom of the tank to allow accumulated sludge to leave the tank, and an outlet line is provided immediately above the media pack.

Malone II employs a tank having an upper filtration chamber and a lower expansion chamber fluidically connected to each other by a constricted passageway. An inlet line supplies water to the tank through the lower chamber, while a floating media pack forms within the upper chamber during filtration. As in Malone I, an outlet line is connected to the tank above the media pack and delivers filtered water back to the aquatic environment. Contrary to Malone I, however, backwashing is accomplished by the displacement and expansion of the media pack through the constricted passageway. The turbulence of this expansion causes the filtered matter and sludge to fall toward a drain line located at the bottom of the tank.

While these devices are well-suited to accomplishing the objectives stated in those patents, there are some aquaculture environments which require more careful management of the biofloc remaining on the media after backwashing. Biofiltering depends heavily on the gradual formation of a film of biofloc on the individual elements of the media pack. Highly turbulent backwashing methods can shear away this film and lessen the effectiveness of the filtration. Therefore, it would be desirable to have a biofilter which avoids excessive damage to the media biofloc, but which still satisfies the goals of removing suspended solids, minimizing water loss during backwashing, reducing biochemical oxygen demand (BOD), and providing nitrification for the aquaculture subject to filtration.

SUMMARY OF THE INVENTION

Therefore, it is an object of this invention to provide a floating media biofilter which allows treatment of a wastewater stream in a single treatment device.

It is another object of this invention to provide a floating media biofilter which has a higher filtration capacity than comparable wastewater treatment systems, but whose tank volume is minimized, reducing associated capital costs.

It is still another object of this invention to provide a floating media biofilter which facilitates automated optimization of biofiltration processes (BOD reduction and nitrification).

It is a further object of this invention to provide a floating media biofilter which is particularly adaptable to recirculating waste streams, such as those in high density aquaculture operations.

It is yet another object of this invention to provide a floating media biofilter which reduces aeration, degasification, chemical addition, and water demand of recirculating waste systems by reducing waste impact through rapid biofloc harvesting and solids removal.

Still another object of this invention is to provide a floating media biofilter whose backwashing cycle ensures maximum protection against biofloc dislodgement.

Yet another object of this invention is to provide a floating media biofilter which is easy to use and maintain, and which requires less power to operate than prior devices.

it is another object of this invention to provide a floating media biofilter which accomplishes various combinations of the above objects.

These and other objects and advantages of the present invention will no doubt become apparent to those skilled in the art after having read the following description of the embodiments which are contained in and illustrated by the various drawing figures.

Accordingly, a biofilter is provided, comprising a tank having a bottom and a sidewall, said sidewall having a lower portion inwardly sloping toward said bottom, and an upper portion; floating media means in said tank for forming a floating media pack when said tank is filled with liquid and said media means are undisturbed; an upper screen, positioned in said upper portion of said tank above said media means, having openings adapted to prevent said media means from passing therethrough; circulation means operatively attached to said tank for causing substantially non-expansive circulation of said media means during backwashing operations; an inlet line in fluid communication with said tank below said media means; a sludge line in fluid communication with said bottom of said tank; an outlet line in fluid communication with said tank above said upper screen; weir means, positioned above said upper screen and in fluid communication with said outlet line, for collecting filtered liquid from said tank and delivering said filtered liquid to said outlet line; and a bypass line in fluid communication between said inlet line and said weir means.

A method of backwashing a biofilter is also provided, comprising the steps of operating said circulation means to cause said media means to circulate within said tank at a speed fast enough to dislodge filtered matter from said media means, but slow enough to prevent excessive damage to said biofloc film; diverting nonfiltered liquid from said inlet line into said bypass line; allowing said nonfiltered liquid to flow over said weir means onto said media means during the circulation of said media means; collecting said filtered matter in said tank below said media means; and removing said filtered matter from said tank through said sludge line.

DETAILED DESCRIPTION OF THE PREFERRED EMBODIMENT

Figures 1, 4:
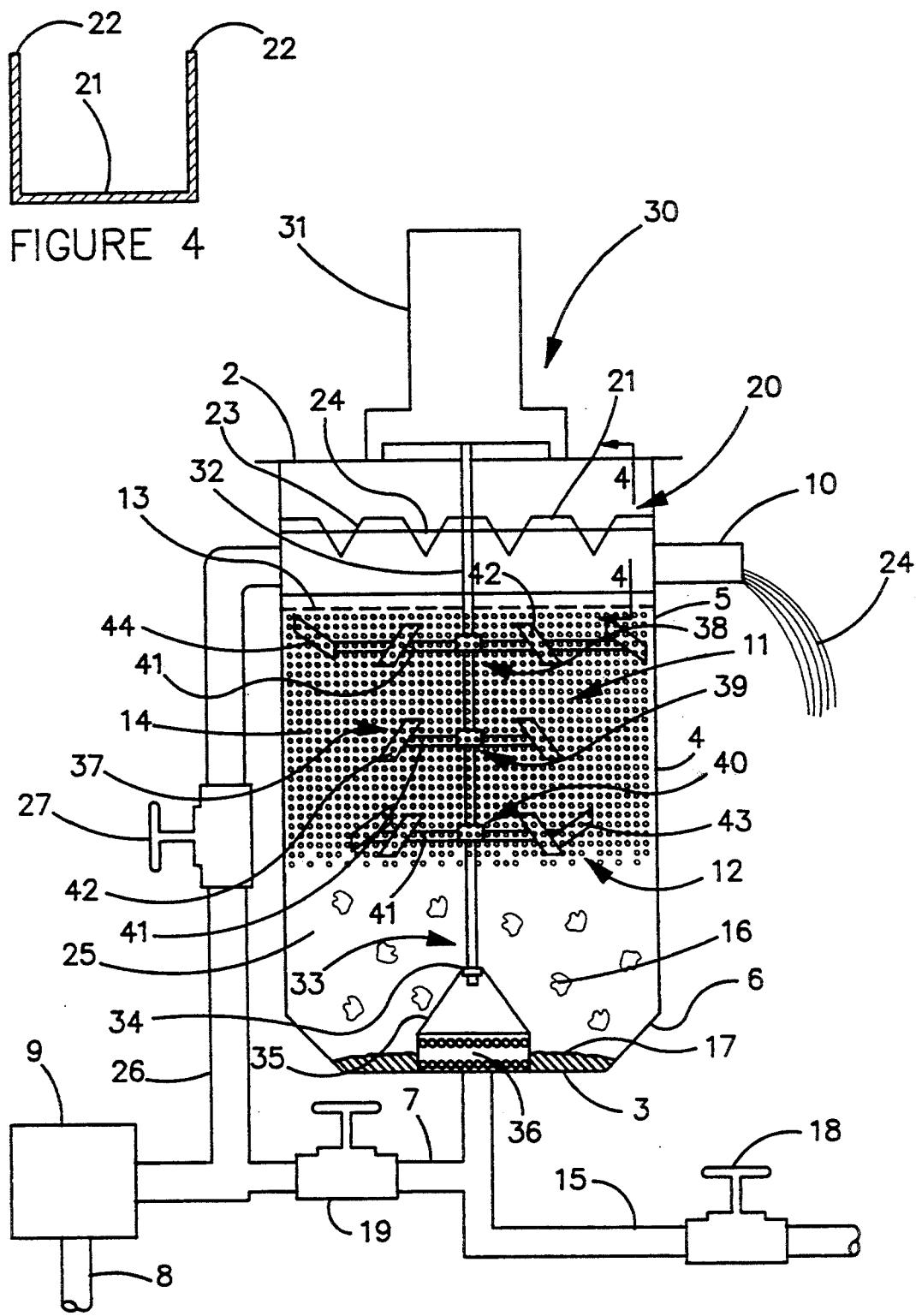
FIG. 1 is a sectional view of an embodiment of the invention depicting the main structural components.
FIG. 4 is a sectional view of the weir employed in the embodiment of FIG. 1.

In the drawings many details pertaining to fabrication and maintenance utility well-established in the machine construction art and not bearing upon points of novelty are omitted in the interest of descriptive clarity and efficiency.

Turning now to FIG. 1, a floating media biofilter 1 is shown in a preferred embodiment during the filtration mode of operation. The biofilter 1 generally comprises tank 2, having a bottom 3 and a sidewall 4, floating media 11, upper screen 13, inlet line 7, outlet line 10, sludge line 15, weir means 20, and circulation means 30. Biofilter 1 performs filtration of suspended solids from a liquid source as well as biological treatment of waste flowing through biofilter 1. Backwashing and sludge removal are also accomplished within the same tank 2. Although the disclosed invention can be used in the filtration of a wide variety of liquids, water is most common and will be used in the following description for the sake of simplicity.

Sidewall 4 includes an upper portion 5 and a lower portion 6. Lower portion 6 is preferably sloped inwardly toward bottom 3 at least to some degree, but can also take on a conical shape to allow for maximum concentration of sludge in bottom 3. Preferably, the slope angle of lower portion 6 is about 45° to about 60° from horizontal. Tank 2 is constructed from any suitable material such as plastic, fiberglass, or steel, and may supported by any convenient means, such as a support base (not shown). Although not required, the most preferable cross-sectional shape of tank 2 is cylindrical to facilitate adequate circulation of media means 11 during backwashing. The minimum volume of tank 2 should be sufficient to contain the entire media pack 12 volume of media means 11, plus an additional volume equal to about 25%–50% of the media pack 12 volume to accommodate sludge fallout.

Inlet line 7, having inlet valve 19, is in fluid communication with tank 2 and provides a source of water 25 to be filtered, and is delivered to tank 2 from source line 8 by any means capable of lifting the water to the top of tank 2, such as pump 9. Filtered water 24 exits tank 2 by way of outlet line 10 where it is returned to the aquaculture source. Floating media means 11 are present within tank 2 and form a floating media pack 12 when tank 2 is filled with water. Upper screen 13 is positioned in tank 2 above media means 11, but below outlet line 10, and comprises a mesh, preferably of stainless steel, sufficient to prevent floating media pellets 14 from passing therethrough. Weir means 20 is attached to tank 2 directly above upper screen 13 and is in fluid communication with outlet line 10. Weir means 20 collects clarified water 24 from media pack 12 and delivers it to outlet line 10, and may simply comprise a channel member 21, as illustrated in FIG. 4. Preferably, the both sides 22 of channel member 21 include several V-shaped notches 23 to regulate the flow of clarified water 24 into outlet line 10. Sludge line 15, having sludge valve 18, is in fluid communication with bottom 3 of tank 2 for allowing accumulated sediment, sludge and waste water to be removed. Preferably, bypass line 26, having bypass valve 27, is in fluid communication between inlet line 7 and weir means 20. It will be understood by those of ordinary skill that the functions of bypass valve 27 and inlet valve 19 may be combined in a 3-way valve (not shown) without detracting from the utility of the invention. Lower screen 36 is attached to bottom 3 for helping to diffuse source water 25 from inlet line 7, and for preventing large organic matter from entering tank 2. Lower screen 36 also serves to break up concentrated regions of sludge 17 during backwashing.

Inlet line 7, outlet line 10, and bypass line 26 are sized to accommodate flow rates appropriate for the particular application. For example, in aquaculture applications flow rates of about 5–15 gallons per minute (gpm) per cubic foot ($ft^3$) of media means 11 are generally used, assuring that oxygen and ammonia transport rates are matched with the ammonia and biochemical oxygen demand (BOD) loadings. In high substrate regimes associated with wastewater treatment, flow rates are increased into a range of about 20–40 gpm/$ft^3$ to avoid oxygen depletion. Inlet, outlet, and bypass lines 7,10,26 may be constructed of any suitable material, such as commercially available polyvinylchloride (PVC) pipe.

Floating media 11 preferably comprise multiple low density granular media pellets 14. Pellets 14 may be of any suitable material, but plastic is preferred. Low density polyethylene feed stock pellets one-eighth inch in diameter have been found to be suitable in experimental units. Enhanced biofiltration can be achieved by shaping the pellets 14 into tubular or fluted shapes (not shown) which influence the retention of solids produced by biological treatment (biofloc). Importantly, it is the protection of the biofloc film on media pellets 14 that is the primary focus of this invention, as will be further explained below. Sufficient media 11 should be provided so as to form a media pack 12 which provides coverage of upper screen 13 and which has a depth sufficient to provide adequate suspended solids filtration of the particular waste being treated, as well as to provide adequate media surface area for biological treatment of the waste flowing through media pack 12.

During filtration of the source water 25, biological growth forms a film on each pellet 14, which in turn provides nitrification and BOD reduction. Suspended solids removed by media pack 12, as well as biofloc, form a floc 16, some of which falls from media pack 12 and settles to bottom 3 of tank 2, forming sludge 17. Over time during filtration mode, the floc 16 on media pack 12 will tend to bridge from pellet 14 to pellet 14, forming a semi-gelatinous mass which can undesirably increase the pressure differential between inlet line 7 and outlet line 10. This phenomenon is often referred to as "head loss", and requires periodic agitation of the media pack 12 ("fluidization") to loosen solids for removal. Such fluidization is achieved during the backwashing step of operation.

Circulation of media means 11 is accomplished by circulation means 30 attached to tank 2. As depicted in FIG. 1, circulation means 30 includes motor 31 mounted above tank 2, a shaft 32 rotatably attached to motor 31 and extending downward at least partially into media pack 12. Preferably, shaft 32 is supported at its distal end 33 by bearing 34 near bottom 3 of tank 2. Bearing 34 is in turn supported by bearing base 35 above lower screen 36 at a height such that bearing 34 will not be submerged in sludge 17. Blade means 37 is attached to shaft 32 for inducing a central portion of media means 11 to flow downward and outward to create a circulating effect.

As shown in FIG. 1, blade means 37 comprises an upper level 38, an intermediate level 39, and a lower level 40 spaced equidistant from one another along shaft 32, but completely within media pack 12. Each of upper, intermediate, and lower levels 38–40 include cross member 41, which supports a pair of inner blades 42 attached relatively close to shaft 32. Inner blades 42 are pitched to induce a downward flow of media pellets 14 when shaft 32 is caused to rotate by motor 31. Lower level 40 also includes a pair of outer blades 43 attached to cross member 41 which are pitched to induce a radially outward flow of media pellets 14. Outer blades 43 should be placed at a radius along cross member 41 of lower level 40 such that media pellets 14 are caused to travel relatively close to sidewall 4 of tank 2 as they float upward. Similarly, upper level 38 includes a pair of outer blades 44 attached to cross member 41, but which are pitched to induce a radially inward flow of media pellets 14. To ensure that all pellets 14 are circulated, outer blades 44 are preferably located along cross member 41 such that there is only a small clearance between sidewall 4 and the tips of outer blades 44. It can readily be seen that the action of blades 42,43,44 are designed to cause a gradual circulation of media means 11 within tank 2. It will also be appreciated that many other blade configurations may be suitable to producing the desired circulation. For example, the aforementioned blades may be repositioned to produce a circulation in the opposite direction from that just described, but with essentially the same results. Likewise, a corkscrew-type device may be employed along the length of shaft 32 which simply causes an upward or downward flow of media pellets 14. Such a device would also achieve the substantially the same results required to meet the goals of the invention, namely slow circulation of the media pack 12.

OPERATION OF THE BIOFILTER

Figure 2:
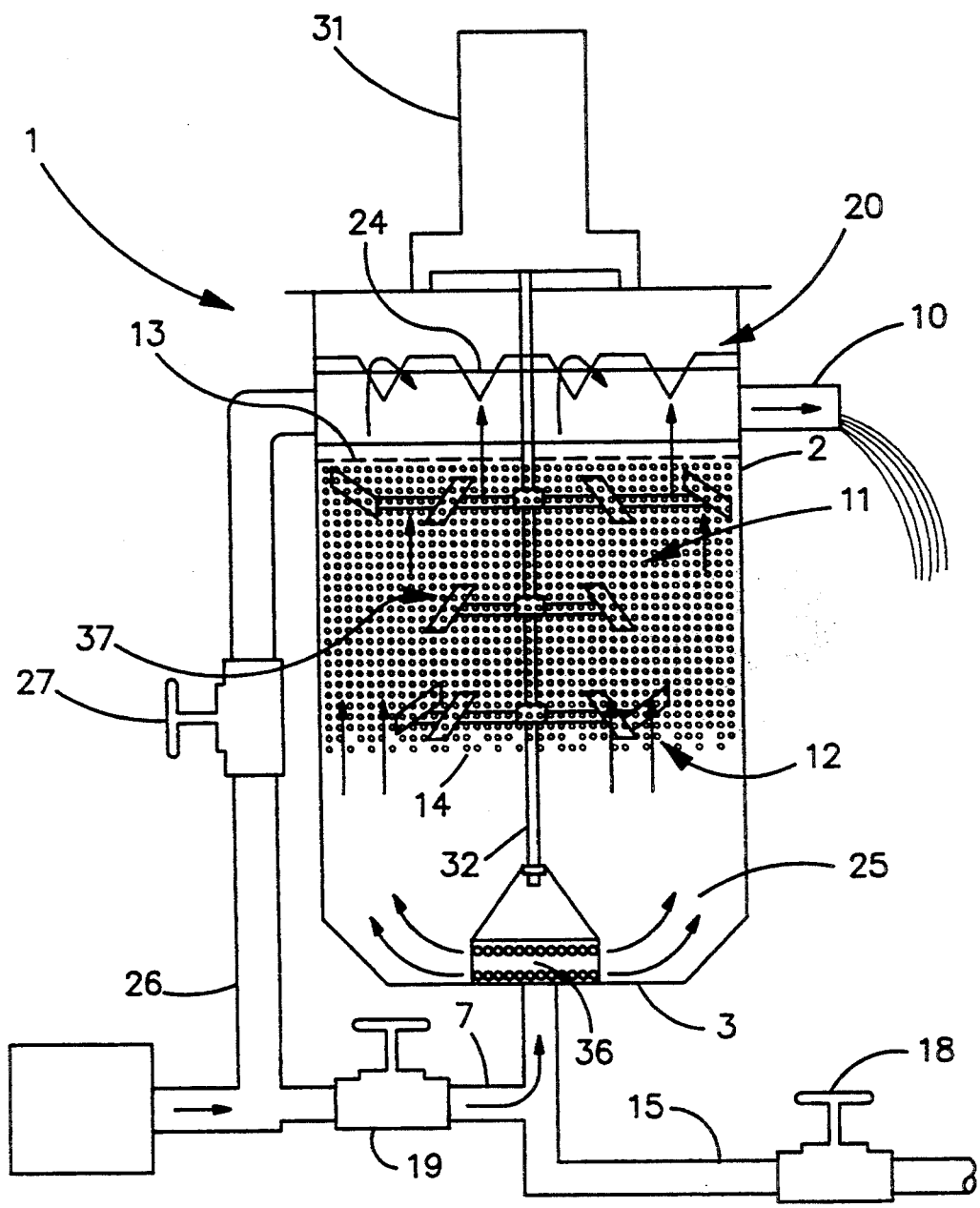
FIG. 2 is a sectional view of the invention of FIG. 1 during filtration mode.

In operation, the embodiment of the biofilter 1 described above is both simple to use and maintain. During the filtration mode of operation shown in FIG. 2, bypass valve 27 and sludge valve 18 are closed, and pump 9 delivers source water 25 through inlet line 7 into tank 2. Floating media means 11 rise with the level of the water and are prevented from flowing out of tank 2 through weir means 20 by upper screen 13. Pellets 14 in media means 11 quickly form a media pack 12 below upper screen 13, which traps unwanted particles and other matter from the water. Filtered water 24 flows over weir means 20 and exits tank 2 through outlet line 10 and is returned to its source by any effective conduit (not shown). Over time, a floc 16 will develop in and around media pack 12 which becomes rich in nitrifying bacteria and aids in the filtration of biological contaminants from the source water 25.

When the media pack 12 becomes undesirably congested after long periods of filtration, the biofilter 1 must be backwashed to remove accumulated sludge 17 which has fallen to the bottom 3 of tank 2, and the media pack 12 must be circulated to dislodge the floc 16 and other suspended solids which have become adhered to pellets 14. If biofilter 1 is not occasionally backwashed, the hydraulic conductivity of the media pack 12, i.e. the ability of the media pack 12 to allow the flow of water therethrough, will continue to decrease with a corresponding increase in head loss. Such conditions result in the uneven distribution of water, waste and oxygen throughout the media pack 12, and hence poor filtration. Therefore, the primary goal in operating the biofilter 1 is to minimize the head loss associated with decreases in hydraulic conductivity, while maximizing the quantity and viability of nitrifying bacteria needed to digest waste matter. One of the most important considerations is maintaining the average age of bacteria in the biofloc within the period of time required for optimum nitrification. This is commonly referred to as the "mean cell residence" time, and is approximately 3–4 days for most aquaculture filtration applications. This period of time, along with the particular waste loading for the specific aquatic environment, will greatly affect the frequency of backwashing operations.

Figure 3:
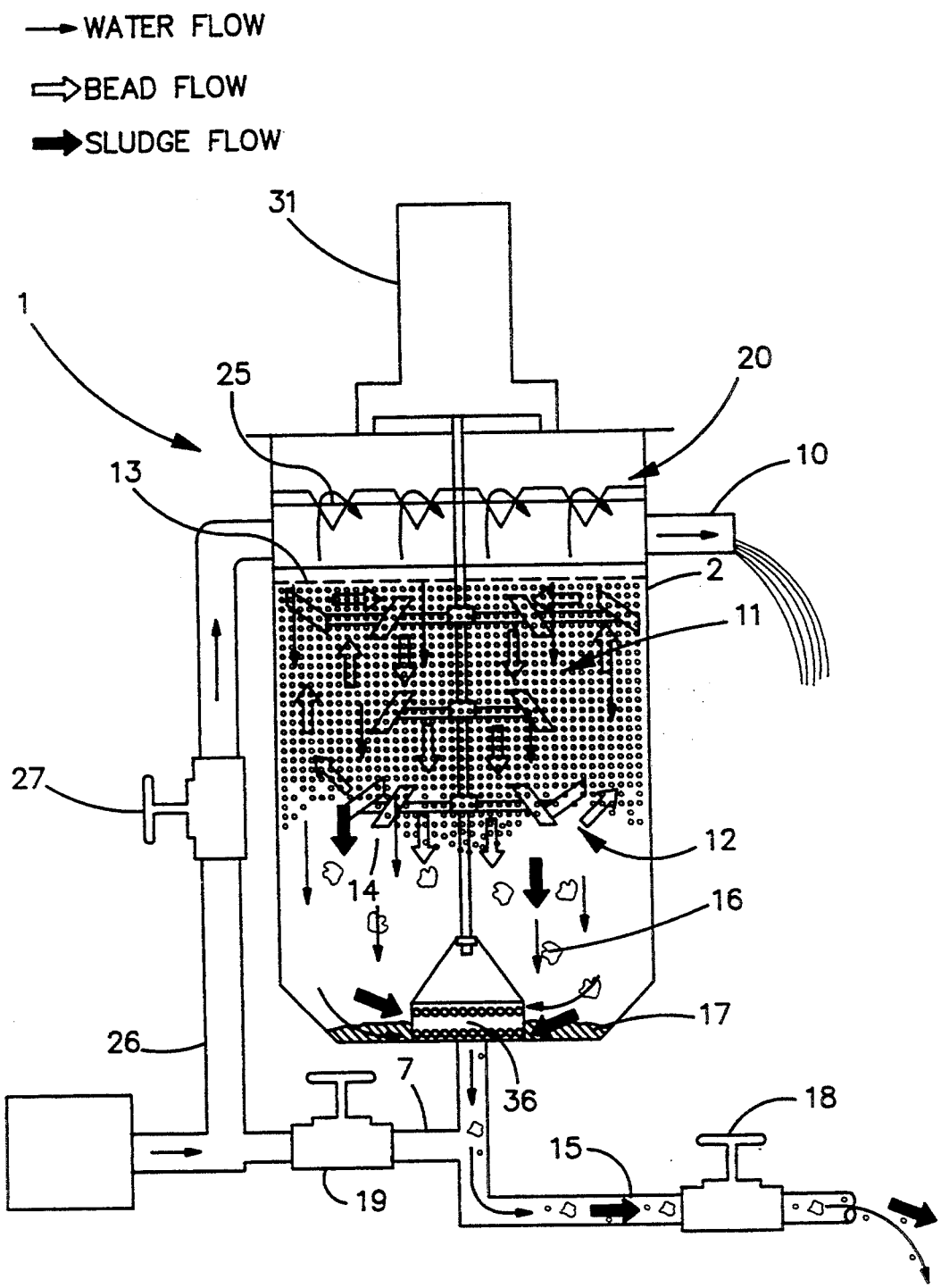
FIG. 3 is a sectional view of the invention of FIG. 1 during backwashing mode.

Backwashing can be accomplished by at least two different methods. In the first method shown in FIG. 3, bypass valve 27 is opened and inlet valve 19 is closed. Source water 25 is thereby redirected into weir means 20 and into outlet line 10. Circulation means 30 is then activated by energizing motor 31, and sludge valve 18 is opened. Sludge 17 and water exit through sludge line 15 while media pack 12 is caused to circulate and dislodge waste matter. As the level in tank 2 decreases, the flow of water over weir means 20 is reversed, allowing water to overflow onto the circulating media pack 12. This overflow action assists in the purging of the released solids from the interstitial spaces between media pellets 14. Neither the water level nor the media pack 12 drop when sludge valve 18 is opened, because the flow of inlet water greatly exceeds the sludge removal rate. Importantly, it is preferable to maintain a relatively slow speed of blade means 37, such as between 10 RPM and 200 RPM, in order to minimize damage to the biofloc film on pellets 14. In experiments conducted by the inventor, a speed of 30 RPM for a period of about 4-5 minutes was noted to produce beneficial results. At these slow speeds, there is substantially no expansion of the volume of media pack 12. Prior methods of biofiltration involving high-speed propellers (approximately 1000-2000 RPM) resulted in excessive damage to the biofloc on pellets 14, and resulted in expansion of the media pack by about 200%-400%. This circulation and backwashing step is continued for a period of time suitable for dislodging waste matter and sludge from the media pack 12, and until the water exiting sludge line 15 runs clear for a period of time selected to assure proper mean cell residence for biological treatment objectives. Such periods of time are highly dependent upon the particular needs of the aquaculture environment and would be readily determinable by those of ordinary skill. Backwashing is terminated and filtration is resumed by stopping motor 31, closing sludge valve 18 and bypass valve 27, and reopening inlet valve 19. The buoyancy of media means 11 and the resumption of upward flow of water results in the swift return of media means 11 to a tightly formed media pack 12.

Alternatively, backwashing can be accomplished by opening bypass valve 27 and closing both inlet valve 19 and sludge valve 18. Circulation means 30 is then activated by energizing motor 31 so that media pack 12 can be circulated by blade means 37 without the removal of water or sludge 17 from sludge line 15. Once most of the released solids fall from media means 11 into bottom 3 of tank 2, sludge valve 18 is opened with blade means 37 continuing to agitate media means 11. After sludge 17 is removed, motor 31 is shut off to allow water flowing over weir means 20 to urge finer, poorly settleable particles from media means 11 into the more quiescent zone at bottom 3 and through sludge line 15. This sequential backwashing procedure takes maximum benefit from the tendency of released solids to rapidly settle, thus reducing the water loss associated with backwashing. Finally, allowing the water from weir means 20 to flow through media means 11 eliminates the unsightly discharge of turbid waters that can occur at the start of the filtration cycle as lighter solids are pushed through media pack 12.

In the invention disclosed herein, regardless of the backwashing method employed, the substantially nonexpansive circulation of media pack 12 affords one the opportunity to (1) minimize the required volume of tank 2, (2) reduce the size and power requirements of motor 31, and (3) reduce the potential for entrapment of pellets 14 in lower screen 36, the combination of which saves space and capital costs. Advantageously, the slow speeds of circulation means 30 provides a lowered sensitivity of biofilter 1 to the precise duration of circulation. This desensitization renders the invention more amenable to automation and results in a substantial increase in biological stability of the filtration process.

Although the present invention has been described in terms of specific embodiments, it is anticipated that alterations and modifications thereof will no doubt become apparent to those skilled in the art. For example, it will be understood that any pre-filtering of large solids from the source water prior to entering the biofilter would improve filtration efficiency and reduce the frequency of backwash operations. Also, automation of the backwashing process through any appropriate control system could be applied to any embodiment of the invention. It is therefore intended that the following claims be interpreted as covering all such alterations and modifications which fall within the true spirit and scope of the invention.

I claim:
1. A biofilter, comprising:
   (a) a tank having a bottom and a sidewall, said sidewall having a lower portion sloping toward said bottom, and an upper portion;
   (b) floating media means in said tank for forming a floating media pack when said tank is filled with liquid, said media means being covered with a biofloc film;
   (c) an upper screen, positioned in said upper portion of said tank above said media means, having openings sized to prevent said media means from passing therethrough;
   (d) rotating circulation means, wherein said circulation means rotates at a speed of less than 200 rpm such that the volume of said media means remains substantially constant and excessive damage does not occur to said biofloc film during backwashing operations;
   (e) an inlet line in fluid communication with said tank below said media means;
   (f) a sludge line in fluid communication with said bottom of said tank; and
   (g) an outlet line in fluid communication with said tank above said upper screen.

2. The biofilter according to claim 1, further comprising a lower screen, having openings sized to allow sludge to pass therethrough, positioned in said tank between said media means and said inlet line and between said media means and said sludge line.

3. The biofilter according to claim 1, further comprising weir means, positioned above said upper screen and in fluid communication with said outlet line, for collecting filtered liquid from said tank and delivering said filtered liquid to said outlet line.

4. The biofilter according to claim 3, further comprising a bypass line in fluid communication between said inlet line and said weir means.

5. The biofilter of claim 1, wherein said floating media means includes a plurality of low density granular media pellets.

6. The biofilter according to claim 1, wherein said circulation means includes:
   (a) a motor attached to said tank;
   (b) a shaft attached to said motor and at least partially submerged within said media pack; and
   (c) blade means attached to said shaft for inducing a portion of said media means to flow downward.

7. The biofilter according to claim 3, wherein said weir means comprises a trough-shaped member having a plurality of V-shaped notches spaced therealong.

8. The biofilter according to claim 1, further comprising means, connected to said tank and said circulation means, for determining a pressure differential across said media pack and for controlling operation of said circulation means in response to preselected threshold levels of pressure differential.

9. In a biofilter, comprising:
a tank containing floating media means for forming a floating media pack when said tank is filled with liquid, said media being covered with a biofloc film;
an upper screen, positioned in said tank above said media means, having openings sized to prevent said media means from passing therethrough;
rotating means attached to said tank for circulating said media means during backwashing operations;

an inlet line in fluid communication with said tank below said media means;

a sludge line in fluid communication with said tank below said media means; and an outlet line in fluid communication with said tank above said upper screen;

a method for backwashing said biofilter, comprising the steps of:

(a) operating said rotating circulation means at a speed of less than 200 rpm such that the volume of said media means remains substantially constant and excessive damage does not occur to said biofloc film;

(b) collecting said filtered matter in said tank below said media means; and (c) removing said filtered matter from said tank through said sludge line.

10. The method according to claim 9, wherein said biofilter further comprises:

weir means, positioned above said upper screen and in fluid communication with said outlet line, for collecting filtered liquid from said tank and delivering said filtered liquid to said outlet line; and a bypass line in fluid communication between said inlet line and said weir means;

further comprising the steps of:

(d) diverting a nonfiltered liquid flow from said inlet line into said bypass line; and (e) allowing said nonfiltered liquid flow to flow over said weir means onto said media means during said circulation of said media means.

11. The method according to claim 10, further comprising the steps of:

(f) ceasing operation of said circulation means after said filtered matter has been removed from said tank; and (g) continuing to allow said nonfiltered liquid flow to flow over said weir means onto said media means to remove poorly settleable solids from said media means.

12. A biofilter, comprising:

(a) a tank having a bottom and a sidewall, said sidewall having a lower portion sloping toward said bottom, and an upper portion;

(b) floating media means in said tank for forming a floating media pack when said tank is filled with liquid, said media means being covered with a biofloc film;

(c) an upper screen, positioned in said upper portion of said tank above said media means, having openings sized to prevent said media means from passing therethrough;

(d) rotating circulation means, wherein said circulation means rotates at a speed of less than 200 rpm such that the volume of said media means remains substantially constant and excessive damage does not occur to said biofloc film during backwashing operations;

(e) an inlet line in fluid communication with said tank;

(f) a sludge line in fluid communication with said tank; and (g) an outlet line in fluid communication with said tank.

13. The biofilter according to claim 12, wherein said circulation means comprises:

(i) a motor;

(ii) a shaft attached to said motor and extending into said tank;

(iii) a plurality of blades attached to said shaft, said blades being positioned such that rotation of said shaft causes circulation of said media means next to said sidewall.

14. The biofilter according to claim 12, wherein at least one of said blades is pitched to induce a downward flow of said media means and at least one of said blades is pitched to induce a radially outward flow of said media means.

15. The biofilter according to claim 13, wherein at least one of said blades is pitched to induce a downward flow of said media means and at least one of said blades is pitched to induce a radially outward flow of said media means.

* * * * *